June 17, 1930.    J. LIVINGSTONE    1,764,324
AIR MOTOR
Filed Sept. 28, 1929    2 Sheets-Sheet 1

INVENTOR
James Livingstone
BY
J. L. Rivers
ATTORNEY

June 17, 1930.　　　J. LIVINGSTONE　　　1,764,324
AIR MOTOR
Filed Sept. 28, 1929　　　2 Sheets-Sheet 2

INVENTOR
James Livingstone
BY
J. R. Rivers,
ATTORNEY

Patented June 17, 1930

1,764,324

UNITED STATES PATENT OFFICE

JAMES LIVINGSTONE, OF SEATTLE, WASHINGTON, ASSIGNOR OF ONE-TENTH TO HARRY E. STANLEY, OF SEATTLE, WASHINGTON

AIR MOTOR

Application filed September 28, 1929. Serial No. 395,858.

This invention has reference to a motor wherein controlled atmospheric pressure and a vacuum produced within the motor give a reciprocating movement to a piston operatively disposed therein, the piston acting on ratchet mechanism which imparts a rotary movement to a wheel carrying a drive shaft, a working power thereby being supplied to said wheel.

In air motors, where compressed air is employed for imparting motion, the mechanism for supplying or storing said air must have a power and strength which will adequately take care of the air pressure produced, making it necessary that said mechanism should be weighty in construction when power for practical purposes and ordinary use is thus generated.

The objects of this invention, generally stated, are, to provide an air motor in which the mechanism for applying the atmospheric pressure and supplying the vacuum for the purpose heretofore mentioned will be less powerful and essentially lighter in weight than that required for providing compressed air as a motive power in a motor of equal capacity; and, to make available a motor of the class to which it belongs which is devoid of complicated parts and may be operated and maintained in operative condition at a relatively low cost.

In the accompanying drawings—

Figure 1:
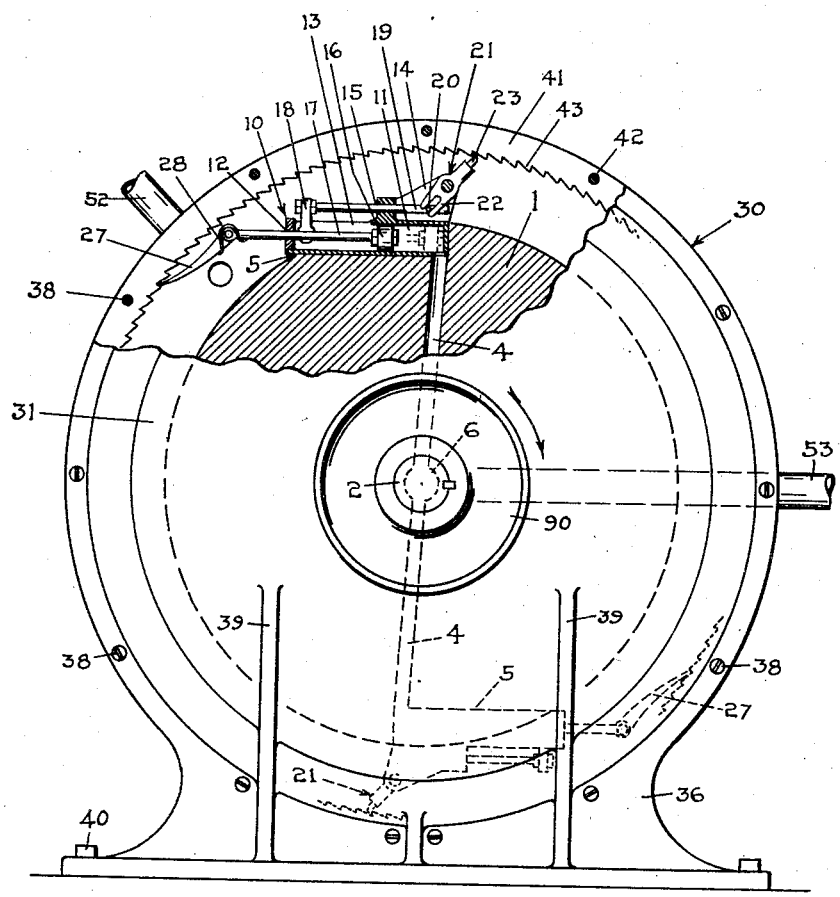
Figure 1 is a side elevation of the device, the casing being partly broken away to better illustrate said piston, ratchet mechanism and wheel, a second unit of said movable parts being shown in dotted lines, and a pair of pipes for connecting up the casing with the atmosphere and a source of vacuum supply being indicated in broken sections.
Figure 2:
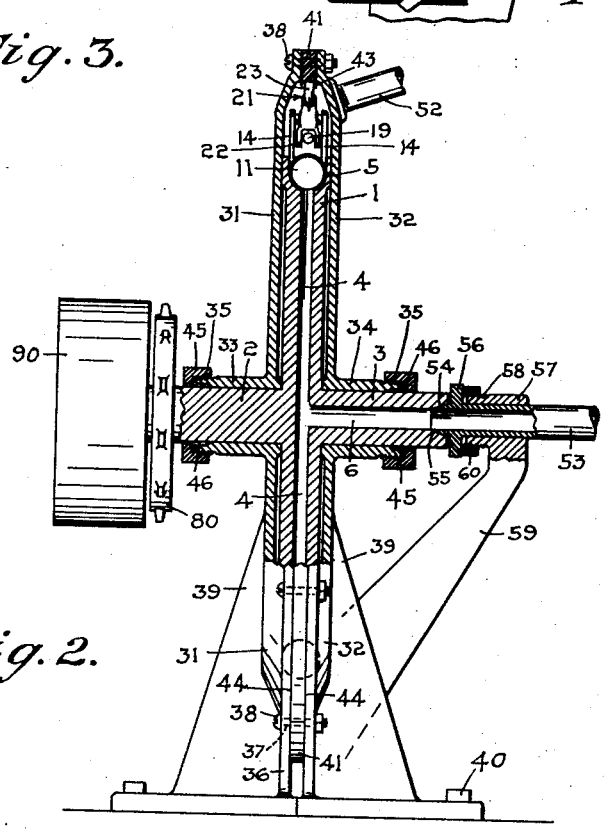
Fig. 2 is an end elevation of the same, portions being shown in sections and broken away.

Referring more particularly to the drawings, a wheel, designed to be rotatably mounted in an air-tight casing which will be described presently, is provided with a body portion 1, substantially of solid construction, having axially aligned and integral shaft members 2 and 3. In the present embodiment of the invention, said wheel is provided with a bore-like opening 4 which extends crosswise of the wheel until it terminates at each end in a recess 5 formed in the rim of the wheel, as indicated in Fig. 1. A second bore-like opening 6 extends through said member 3 and the body portion of the wheel until it establishes communication with the opening 4, as is shown in Fig. 2. Each of said recesses is designed to afford a seat for parts of identical construction, consequently but one assembly of said parts will be described.

A tubular member, generally designated as 10, is fixedly secured in a recess. One end of the tubular member communicates with said opening 4 and functions as a piston cylinder 11 while its other end is apertured, as at 12, and carries a slot 13 and an upstanding support 14, having an apertured portion 15. A piston, mounted in the tubular member, is provided with a head 16, operative in said cylinder, a rod 17, slidably engaged in the apertured end of the tubular member, and an upstanding support 18, slidably engaged in said slot. 19 denotes a rod secured to the support 18 and slidably engaged with the apertured portion 15, the said rod carrying a laterally extending pin 20. A pawl member, generally denoted as 21, is pivotally connected with the support 14, and is provided at one end with a bifurcated portion 22 straddling the pin 20, and at its other end with a catch 23, said catch being held in place within said member by a transverse pin 24 slidably engaged in a pair of oppositely disposed slots 25 located adjacent to but within the outer terminal of the last-named end of the member, and put under tension by a helical spring 26. At the outer end of the piston rod is a second pawl member, comprising a catch 27, pivotally connected with the rod, and held in place and put under tension by a sear spring 28. To complete the assembly of piston and pawl elements in accordance with the embodiment of the invention shown, another set of the same is installed on the wheel in the other recess 5, and as indicated by dotted lines in Fig. 1.

The casing of the motor, designated generally as 30, comprises a pair of complementary portions 31 and 32, each being provided with a centrally located and laterally disposed sleeve-like portion, denoted as 33 and 34, and each exteriorly threaded at its free end, as at 35. The complementary portions, when assembled as will be presently and more particularly described, provide an airtight casing having a hollow circular outlined body portion merging into a base section 36, said complementary portions each having a set of openings 37 made in the rim and base sections thereof, adapted to align one with the other when the portions are fitted together and to accommodate the bolts 38 for securing said portions in place. The body of the casing is stabilized by the braces 39, and the base is designed to take the bolts 40 for securing the motor in a fixed position when in use.

An annular ratchet member, adapted to be mounted in the casing, is provided with a body portion 41 having a plurality of openings 42 complementary to the openings 37, and a plurality of teeth 43 extending throughout its inner circumference.

In assembling the wheel as now equipped and said ratchet member within the casing, a bolt 38 is placed in each of the openings 37 in the portion 31, the heads of the bolts being disposed flush with the outer periphery of the portion, and said ratchet member is then placed thereover through its openings 42. Next, the wheel is placed within said portion, the shaft member 2 of the wheel being disposed in the sleeve-like portion 33, the portion 32 is then brought into juxtaposition with the portion 31, the shaft member 3 of the wheel being slid into the sleeve-like portion 34 and the bolts 38 brought through the openings in the portion 32, the nuts are then applied to the bolts and tightened up, thereby securing the portions 31 and 32 in place with the annular ratchet member disposed therebetween. As it is essential that the casing be airtight, or substantially so, the said ratchet member and the sections of the casing which contact therewith are machined so as to provide smooth, airtight joints, as indicated at 44. 45 denotes an end piece threadedly secured to each free end 35 of the portions 33 and 34 of the casing, the same being apertured to accommodate the shaft members of the wheel and permit them to rotate therein, and packing 46 is interposed between said portions and members, to further provide an airtight construction for the casing. When said wheel and ratchet member are thus installed, the wheel is obviously rotatable within the casing and the annular ratchet member presents a set of continuous ratchet teeth encircling the wheel and engagable by the pawls heretofore described.

For exhausting air from the casing and wheel, a vacuum tank 50 is provided. A vacuum may be produced and maintained in this tank in any suitable manner. 51 designates a header pipe leading from said tank and connecting up with a pipe line 52 which communicates directly with the casing, and 53 another pipe line extending from said header pipe and communicating directly with the bore-like opening 6 in the shaft member 3 of the wheel. The instrumentalities which co-operate in connecting up the pipe line 53 with the shaft member 3, consist of a beveled portion 54 at the free end of said pipe line which fits into a complementary portion 55 in said shaft member, a flange 56 integral with the pipe from which it extends, an apertured head 57 having an exteriorly threaded portion 58, said head being integral with the support 59, extending from the casing, and a nut 60 for securing the free end of the pipe line 53 in place in said shaft member. The pipe line 61 is adapted to communicate with the atmosphere at its free end 62, and connects up at its other end with the pipe line 52, and the pipe line 63 likewise communicates with the atmosphere at its free end 64 and connects up at its other end with the pipe line 53. Each of said pipe lines is provided with a valve of the plug type, and while each is of identical construction, to make their functions more easily understood, the two which control the atmospheric pressure are denoted as 70 and 71 and the two which control the evacuation of air from the casing and wheel are designated as 72 and 73. A manually operated valve of the same type and denoted as 74 is mounted in the header pipe and adjacent to said tank, said valve being designed to permit an exhaustion of air in the tank independently of the motor and said piping, when required.

Figures 3, 4:
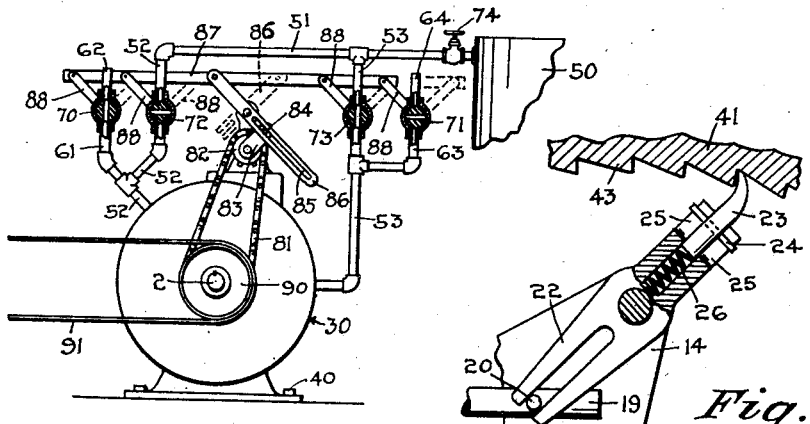
Fig. 3 is a diagrammatic view of said motor and a vacuum tank broken away, particularly illustrating the piping connecting up the casing of the motor with the atmosphere and said tank, a series of valves for controlling said piping, and mechanism for operating the valves.
Fig. 4 is an enlarged view of one of the pawls of said ratchet mechanism, said pawl being partly sectionized, and the view including a portion, shown as broken away, of an annular ratchet member, said member being engageable by the pawl.

Mechanism for automatically opening and closing the valves in said pipe lines is diagrammatically illustrated in Fig. 3, the same comprising a sprocket wheel 80 fixedly secured to the shaft member 2, as more clearly appears in Fig. 2, which wheel is connnected by the chain 81 with a smaller sprocket wheel 82. Keyed to the shaft of the last-named wheel is a crank 83 carrying a wrist pin 84 which operates in the slot 85 of the pivotally mounted arm 86, said parts serving to impart reciprocating rectilinear motion to the bar 87 pivotally connected with said arm, and said bar serving to convey a rotary motion to the valves 70, 71, 72 and 73 for opening and closing the same through the links 88, each pivotally connected with said bar and operatively connected with each of the last-named valves. The dotted lines, designated as 88, indicate the positions of said links when reversely moved.

A pulley wheel 90, fixedly secured to the shaft member 2, and a belt 91, as is evident, are for the purpose of transmitting power from the motor to any suitable means and complete the assembly of the device.

The action of each piston and the ratchet mechanism which cooperates therewith in the motor is identically the same, so in order to simplify the description of their modes of operation, the same will have reference at first to a single set of these parts. In operating the motor, it is assumed that the valve 74 has been opened to permit communication between the vacuum tank and the wheel and casing of the motor, and if deemed expedient an initial impetus may be given to said wheel by manually rotating the pulley wheel in a forward direction and which movement, as is evident, will also put in motion said automatic valves. Assuming now that the valves 70 and 73 have each attained the open position shown in Fig. 3, a vacuum will be created inwardly of the piston head, in the piston cylinder and in and through the openings 6 and 4 in the wheel, and simultaneously with the creation of this vacuum the atmosphere will enter the casing through the pipe line 64 and outwardly of the piston head, with the result that the pawl 21 will be forced against the teeth 43 of the annular ratchet member.

This force is applied through movement of the piston and the elements connecting it with said pawl, produced by said atmosphere working against the piston head and said vacuum. The force will be positive and considerable in extent, and as the wheel is rotatably mounted and obviously less resistant to said force than the fixedly secured annular ratchet member, this force will be communicated to the wheel, thereby impelling said wheel forwardly.

Through the action of the automatic mechanism provided, the valves 70 and 73 will now be closed and the valves 71 and 72 opened. This will result in a reversal of the respective actions of the vacuum and atmosphere, the air being exhausted in the casing and outwardly of the piston head through the pipe line 52 and its connection with the pipe line 61, and the atmosphere entering the openings 3 and 4, through the pipe line 63 and its connection with the pipe line 53, and operating inwardly of the piston head, thereby forcing the pawl 27 against the teeth of the annular ratchet member and imparting another forward movement to said wheel.

When force is applied in the manner described to the pawl 21, the pawl 27, by virtue of its form, its tension element and the movement of the piston rod inwardly, will idle on said teeth, and when force is likewise applied to the pawl 27, the pawl 21, in view of its form, its pivotal connection and tension element, coupled with the outward movement of the piston rod, will also permit the pawl 21 to idle on said teeth. These cycles of operation being repeated the wheel will continue to rotate on its bearings.

The vacuum produced in the tank being constant, and, through the connections provided therefor in the motor, being entirely available for performing its function, and the atmospheric pressure as introduced into the motor being likewise constant, the action of said pressure will take effect on each of the two pistons and the ratchet mechanism cooperating therewith shown in this embodiment of the invention, each pawl contributing a force in its thrust against the annular ratchet member which serves to impart a rotary motion to the wheel. It may therefore be seen as a consequence that by increasing the number of pistons and pawls operative therefrom as described, the momentum and power of the wheel will also be increased, although the device is operative with one piston and ratchet mechanism.

In installing a plurality of sets of pistons and pawls on the wheel, it is desirable that each set be so disposed as to balance the wheel, as indicated by the two sets shown and as more particularly appears in Fig. 1, so when additional sets are mounted on the wheel, it is obvious that the recesses to accommodate the same and the connecting bore-like openings be arranged so as to preserve said balance.

The pawls shown and described afford mechanism instrumental in rotating the wheel, but it is evident that ratchet mechanism of other and different types may be utilized in connection with the annular ratchet member for propelling said wheel. It is also evident that the piping for exhausting air from the motor and connecting the motor with the atmosphere, the valves for controlling the same and the control means for the valves may also be varied.

Other changes in and modifications of the construction described may be made without departing from the spirit of my invention or sacrificing its advantages, hence it is desired that I be not confined to the specific structure set forth, except as limited by the appended claims.

I claim:

1. An air motor, comprising a substantially airtight casing, a wheel rotatable in the casing, an annular ratchet member mounted in the casing and encircling the wheel, a piston cylinder mounted on the wheel, a piston mounted in the cylinder, a pawl pivotally mounted and linked with the piston, said pawl being engageable with said member, a second pawl pivotally connected with the piston and engageable with said member, and means for reciprocating the piston in said cylinder by exhausting air within the motor and at one end of the piston and introducing atmospheric pressure within the motor and at the other end of the piston, and alternately reversing said exhaustion of air and said introduction of atmospheric pressure, and whereby a thrust is imparted to each of said pawls alternately as each is brought into operative engagement with said member by the piston.

2. An air motor, comprising a substantially airtight casing, a wheel rotatably mounted in the casing, an annular ratchet member mounted in the casing and encircling the wheel, piston means mounted for reciprocating movement on the wheel, ratchet means linked with the piston means and operable in the annular ratchet member, means communicating with the casing and the wheel for moving the piston by exhausting air within the motor and at one end of the piston and introducing atmospheric pressure within the motor and at the other end of the piston, and whereby said ratchet mechanism is made to impart a rotary movement to the wheel, and means for automatically reversing the exhaustion of said air and the introduction of said pressure for effecting a reverse movement of the piston and applying a like impelling force to the wheel in its rotary movement.

3. An air motor, comprising a casing, a wheel rotatable in the casing, an annular ratchet member concentric with the wheel, piston means mounted for reciprocating movement on the wheel, ratchet means linked with the piston means and operable in said member, means for moving the piston means in one direction by exhausting air at one end of the piston means and simultaneously introducing atmospheric pressure at the other end of the piston means, whereby said ratchet means is made to impart a rotary movement to the wheel, and means for automatically reversing the exhaustion of said air and the introduction of said pressure, for effecting a reverse movement of the piston means and applying a like impelling force to the wheel in its rotary movement.

4. An air motor, comprising a substantially airtight casing, a wheel rotatably mounted in the casing, an annular ratchet member mounted in the casing and encircling the wheel, piston means mounted for reciprocating movement on the wheel, ratchet means linked with the piston means and operable in the annular ratchet member, and means connected with the casing and the wheel for reciprocating the piston means by exhausting air within the motor and inwardly of the piston means and introducing atmospheric pressure within the motor and outwardly of the piston means, and alternately reversing said exhaustion of air and said introduction of atmospheric pressure, and whereby said ratchet means is made to impart a rotating movement to the wheel.

5. In an air motor having a substantially airtight casing, an annular ratchet member, a wheel for transmitting power rotatably mounted in the casing and concentric with said member, a recess in the wheel, said wheel being provided with a bore-like opening communicating with the recess and terminating exteriorly of the wheel, a piston cylinder mounted in the recess and communicating with said opening, a piston mounted in the cylinder, ratchet means operatively associated with the piston and engageable with said member, and means communicating with the casing and said opening for reciprocating the piston by exhausting air within the motor and at one end of the piston and introducing atmospheric pressure within the motor and at the other end of the piston, and alternately reversing said exhaustion of air and said introduction of atmospheric pressure, and whereby said ratchet means is made to impart a rotating movement to the wheel.

6. In an air motor having a casing and a wheel for transmitting power rotatably mounted in the casing; means for rotating the wheel, including an annular ratchet member encircling the wheel, a piston cylinder mounted on the wheel, a piston, having a piston rod, mounted in the cylinder, a pawl pivotally mounted and linked with the piston, said pawl being engageable with said member, a second pawl pivotally connected with the piston rod and engageable with said member, and means for imparting a reciprocating movement to said piston, whereby a thrust, instrumental in rotating said wheel, is communicated to each of said pawls alternately as each is brought into operative engagement with said member by the piston.

JAMES LIVINGSTONE.